(12) United States Patent
Shirai (10) Patent No.: US 12,015,360 B2
(45) Date of Patent: Jun. 18, 2024

(54) CONTROL SYSTEM AND AUTOMATIC ANALYSIS DEVICE MOUNTED WITH SAID CONTROL SYSTEM

(71) Applicant: HITACHI HIGH-TECH CORPORATION, Tokyo (JP)

(72) Inventor: Kotaro Shirai, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 483 days.

(21) Appl. No.: 17/291,633

(22) PCT Filed: Feb. 6, 2020

(86) PCT No.: PCT/JP2020/004537
§ 371 (c)(1),
(2) Date: May 6, 2021

(87) PCT Pub. No.: WO2020/170834
PCT Pub. Date: Aug. 27, 2020

(65) Prior Publication Data
US 2021/0408955 A1 Dec. 30, 2021

(30) Foreign Application Priority Data

Feb. 20, 2019 (JP) ................................. 2019-028360

(51) Int. Cl.
*H02P 27/04* (2016.01)
*G06F 1/3206* (2019.01)
*H02P 3/06* (2006.01)

(52) U.S. Cl.
CPC .......... *H02P 27/045* (2013.01); *G06F 1/3206* (2013.01); *H02P 3/06* (2013.01)

(58) Field of Classification Search
CPC .......... H02P 27/045; H02P 3/06; H02P 29/00; G06F 1/3206; B01J 4/00; G01N 35/00;
(Continued)

(56) References Cited

U.S. PATENT DOCUMENTS 6,859,139 B1 2/2005 Sato
2005/0028792 A1 2/2005 Hosoya et al.
(Continued)

FOREIGN PATENT DOCUMENTS

JP H0618530 A * 1/1994 ........... G01N 35/025
JP 11-285282 A 10/1999
(Continued)

OTHER PUBLICATIONS

Extended European Search Report received in corresponding European Application No. 20760006.5 dated Nov. 25, 2022.
(Continued)

*Primary Examiner* — Bickey Dhakal
(74) *Attorney, Agent, or Firm* — MATTINGLY & MALUR, PC (57) ABSTRACT

The purpose of the present invention is to provide a control system which, when a sensor is not built in a motor, saves the power of the sensor and increases the life thereof by on/off-controlling power supply to the sensor before and after the operation of the motor, and also to provide an automatic analysis device. The control system 201 is provided with sensors 309a, 309b, 602, 603 for monitoring the operation of a motor and a control mechanism for controlling the operation of the motor. The control mechanism is provided with: a function of starting power supply to the sensors 309a, 309b, 602, 603 before a first predetermined time from the time when the motor starts the rotating operation; and a function of stopping the power supply to the sensors 309a, 309b, 602, 603 after a second predetermined time from the time when the motor terminates the rotating operation.

7 Claims, 9 Drawing Sheets

(58) Field of Classification Search
CPC ........ A61B 1/00036; A61B 2560/0209; G09G 2330/021; H02J 9/005
See application file for complete search history.

(56) References Cited

U.S. PATENT DOCUMENTS

2009/0153086 A1* 6/2009 Narumi ............... H02P 6/18
                                                    318/400.35
2015/0268101 A1  9/2015 Kumahara et al.
2019/0326841 A1* 10/2019 Matsumoto ............ H02P 23/14

FOREIGN PATENT DOCUMENTS

| JP | 2001-178175 A | 6/2001 |
| JP | 2004-147488 A | 5/2004 |
| JP | 2005-030291 A | 2/2005 |
| JP | 2010-181292 A | 8/2010 |
| JP | 2010-233342 A | 10/2010 |
| JP | 2010233342 A * | 10/2010 |
| JP | 2011-013112 A | 1/2011 |
| JP | 2012-255663 A | 12/2012 |
| JP | 2014-161141 A | 9/2014 |
| JP | 2015-125690 A | 7/2015 |
| JP | 2016-032326 A | 3/2016 |
| JP | 2017-068038 A | 4/2017 |
| WO | 2014/016867 A1 | 1/2014 |

OTHER PUBLICATIONS

International Search Report of PCT/JP2020/004537 dated Mar. 31, 2021.
International Search Report of PCT/JP2020/004537 dated Mar. 31, 2020.

* cited by examiner

CONTROL SYSTEM AND AUTOMATIC ANALYSIS DEVICE MOUNTED WITH SAID CONTROL SYSTEM

TECHNICAL FIELD

The present invention relates to a control system and an automatic analysis device including the control system. In particular, the present invention relates to a power saving control method for a sensor that detects motor operation.

BACKGROUND ART

As an example of power saving control of a sensor, there is proposed a technique of providing a relay drive unit between a DC/DC converter and a sensor power supply terminal in order to perform power control of a sensor built in a motor, and allowing a motor control unit to output a signal of opening relay to the relay drive unit when an operation OFF command signal from the outside is input to a servo ON terminal, and interrupting power supply to the sensor by opening the relay to reduce power consumption while the motor operation is OFF.

CITATION LIST

Patent Literature

PTL 1: JP-A-1999-285282

SUMMARY OF INVENTION

Technical Problem

However, in the technique of the related art, there is a problem that, when a sensor is not built in a motor, power consumption of the sensor is relatively high, and the lifetime of the sensor is relatively short.

For example, the technique of PTL 1 does not disclose a handling of a case where the sensor is not built in the motor.

The present invention has been made to solve such a problem, and an object of the present invention is to provide a control system and an automatic analysis device that, when a sensor is not built in a motor, power saving and extension of a lifetime of the sensor is achieved by controlling power supply to the sensor to be ON/OFF before and after an operation of the motor.

Solution to Problem

According to the present invention, a control system includes a sensor for monitoring an operation of a motor and a control mechanism for controlling the operation of the motor, in which the control mechanism includes
  a function of starting power supply to the sensor before only a first predetermined time from a time when the motor starts a rotating operation, and
  a function of stopping the power supply to the sensor after only a second predetermined time from a time when the motor terminates the rotating operation.

This specification includes the disclosure of JP-A-2019-028360, which is the basis of the priority of the present application.

Advantageous Effects of Invention

According to the present invention, by controlling power supply of a sensor that detects a motor operation, it is possible to provide a power saving of the sensor and a device provided with the sensor and extension of a lifetime of the sensor.

DESCRIPTION OF EMBODIMENTS

Hereinafter, embodiments of the present invention will be described with reference to the accompanying drawings.

First Embodiment

A configuration of the embodiment will be described with reference to FIGS. 1 to 6.

Figure 1:
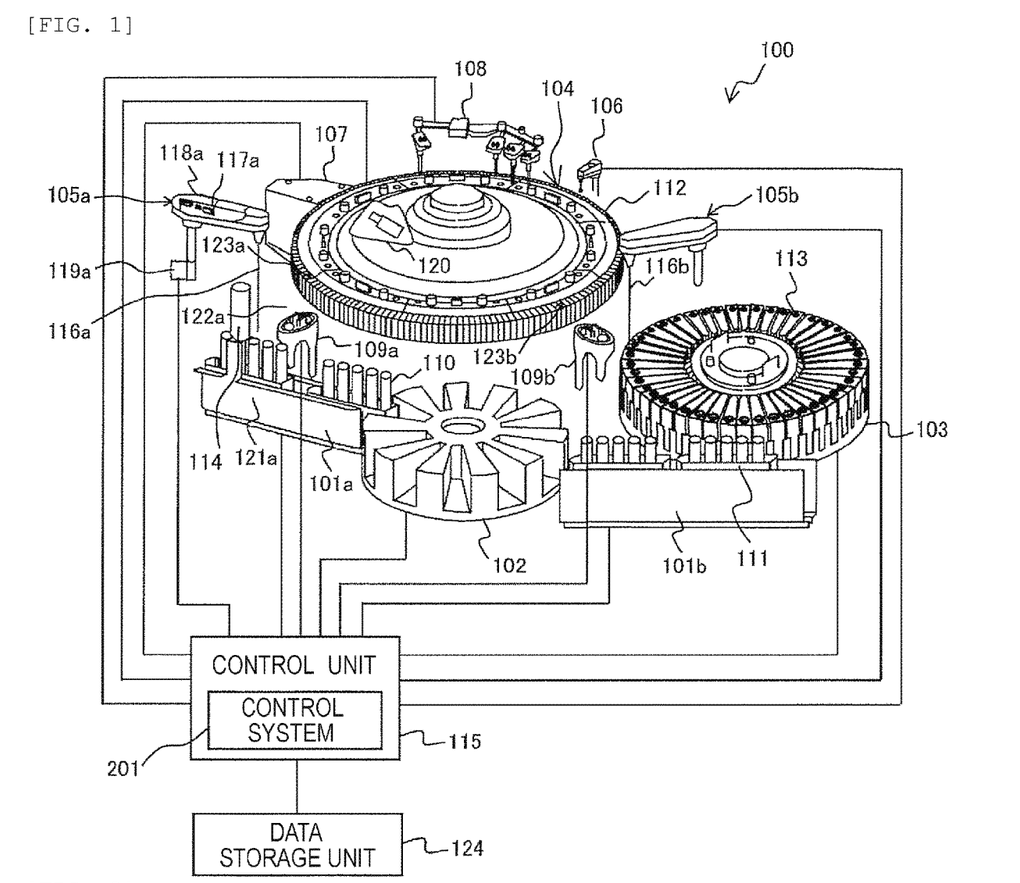
FIG. 1 is a diagram schematically illustrating a configuration of an analyzing unit of an automatic analysis device.

FIG. 1 is a diagram schematically illustrating an analyzing unit 100 of an automatic analysis device according to the embodiment.

In FIG. 1, the analyzing unit 100 includes a specimen conveying line 101*a*, a reagent conveying line 101*b*, a rotor 102, a reagent disk 103, a reaction disk 104, a specimen dispensing mechanism 105*a*, a reagent dispensing mechanism 105*b*, a stirring mechanism 106, a spectrometer 107, a reaction cell cleaning mechanism 108, a specimen nozzle cleaning mechanism 109*a*, a reagent nozzle cleaning mechanism 109*b*, reaction cells 112 (reaction vessels), a shield portion 114, a control unit 115, a specimen dispensing nozzle 116*a*, a reagent dispensing nozzle 116*b*, a specimen liquid level sensor 117*a* (a reagent liquid level sensor is not illustrated), a specimen arm 118*a* (a reagent arm is not illustrated), a motor 119*a* for the specimen dispensing mechanism (a motor for the reagent dispensing mechanism is not illustrated), a light source lamp 120, a data storage unit 124, and the like.

The control unit 115 includes a control system 201 (motor control unit). As such, the automatic analysis device includes the control system 201.

The specimen conveying line 101*a* conveys a specimen container 110 containing a biological specimen such as blood or urine that is an analysis target. The specimen conveying line 101*a* transfers a rack 111 to various portions of the automatic analysis device including a position (a specimen suction position 121a that is referred to as a "specimen dispensing position") where the specimen dispensing mechanism 105a suctions the specimen. The rotor 102 is connected to the specimen conveying line 101a, and thus, exchange of the rack 111 is performed between the plurality of specimen conveying lines 101a by rotating the rotor 102.

The reagent disk 103 is for conveying a plurality of reagent containers 113 containing reagents used for specimen analysis, which are mounted to be arranged in the circumferential direction. The reagent disk 103 rotates and transfers the target reagent container 113 to a position (a reagent suction position or a reagent dispensing position) where the reagent dispensing mechanism 105b suctions a reagent, a replacement position of the reagent container 113, or the like.

The reaction disk 104 is for carrying a plurality of the reaction cells 112 in which the specimen and the reagent are mixed and reacted, which are mounted to be arranged in the circumferential direction. The reaction disk 104 conveys the reaction cell 112 to a specimen discharge position 123a where the specimen is discharged by the specimen dispensing mechanism 105a and a reagent discharge position 123b where the reagent is discharged by the reagent dispensing mechanism 105b. The reaction disk 104 maintains a reaction solution, which is a mixture of the specimen and the reagent, at a constant temperature by immersing the reaction cell 112 in a constant-temperature medium (for example, water). The reaction disk 104 rotates and transfers the reaction cell 112 to a position such as a stirring position for stirring the reaction solution by the stirring mechanism 106, a measurement position for measuring the reaction solution by the spectrometer 107, and a cleaning position for cleaning the reaction cell 112 for which the analysis has been completed by the reaction cell cleaning mechanism 108.

The specimen dispensing mechanism 105a immerses the specimen dispensing nozzle 116 in the specimen of the specimen container 110 conveyed to the specimen suction position 121a by the specimen conveying line 101a and suctions the specimen. The specimen dispensing mechanism 105a discharges the specimen into the reaction cell 112 of the reaction disk 104 by the specimen arm 118a. As such, the specimen dispensing mechanism 105a performs the dispensing of the specimen. Similarly, the reagent dispensing mechanism 105b immerses the reagent dispensing nozzle 116 in the reagent (reagent according to the analysis target) of the reagent container 113 conveyed to the reagent dispensing position by the reagent disk 103 and suctions the reagent. The reagent dispensing mechanism 105b discharges the reagent into the reaction cell 112 of the reaction disk 104. As such, the reagent dispensing mechanism 105b performs the dispensing of the reagent.

The specimen dispensing nozzle 116a is retained by the specimen arm 118a. The specimen dispensing mechanism 105a is moved by allowing the specimen arm 118a to be moved in a vertical direction and a rotational direction by the motor 119a for the specimen dispensing mechanism. The specimen liquid level sensor 117a for detecting a distance to a liquid level (or the presence of the liquid level) by changing the electrostatic capacitance of the specimen dispensing nozzle 116a is provided to the specimen arm 118a of the specimen dispensing mechanism 105a. The shield portion 114 for suppressing scattering of the specimen by the specimen dispensing mechanism 105a is provided to the specimen suction position 121a.

The stirring mechanism 106 stirs a mixed solution (reaction solution) of the specimen dispensed into the reaction cell 112 by the specimen dispensing mechanism 105a and the reagent dispensed into the reaction cell 112 by the reagent dispensing mechanism 105b in order to promote the reaction of the mixed solution.

The spectrometer 107 performs absorbance measurement by spectroscopically measuring transmitted light of light with which the light source lamp 120 irradiates the reaction solution in the reaction cell 112. Colorimetric analysis is performed based on a result of the absorbance measurement. Herein, the spectrometer 107 and the light source lamp 120 constitute a reaction measuring unit for irradiating the reaction solution of the reaction cell 112 with the light and measuring the transmitted light.

When the specimen dispensing mechanism 105a is moved to a specimen nozzle cleaning position 122a by the motor 119a for the specimen dispensing mechanism, the specimen nozzle cleaning mechanism 109a performs cleaning of the specimen dispensing nozzle 116a by ultrasonic waves.

The reaction cell cleaning mechanism 108 performs cleaning of the reaction cell 112 by suctioning the reaction solution from the reaction cell 112 of which the measurement is completed and discharging a detergent or the like into the reaction cell 112.

The control unit 115 is for controlling entire operations of the analyzing unit 100, executes the analysis operations by controlling the operation of each configuration of the analyzing unit 100, performs the analysis of the specimen based on a detection result of the spectrometer 107, and outputs concentrations of predetermined components contained in the specimen as an analysis result to the data storage unit 124, a display unit (not illustrated), a printer, or the like.

Figure 2:
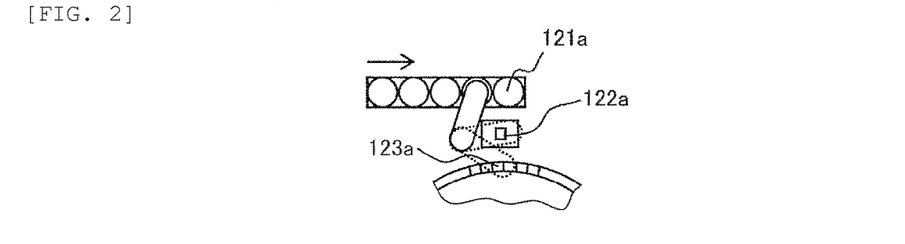
FIG. 2 is a diagram schematically illustrating an operation of a specimen dispensing mechanism.

FIG. 2 is a diagram schematically illustrating an operation of the specimen dispensing mechanism.

When operations of the automatic analysis device are started, the specimen container 110 conveyed on the specimen conveying line 101a stops at the specimen suction position 121a. Then, the motor 119a for the specimen dispensing mechanism is driven by the control system 201. Thus, the specimen arm 118a rotates, the specimen arm 118a moves to the specimen suction position 121a, and after that, the specimen dispensing nozzle 116a performs a vertical moving operation. As such, the specimen dispensing nozzle 116a reaches a position and height at which the specimen can be suctioned.

After the specimen dispensing nozzle 116a suctions the specimen, the motor 119a for the specimen dispensing mechanism is driven to allow the specimen arm 118a to rotate. After the specimen arm 118a moves to the specimen nozzle cleaning position 122a, external cleaning of the tip of the specimen dispensing nozzle 116a is performed by the specimen nozzle cleaning mechanism 109a. This is to prevent carryover of the specimen. After the external cleaning, the motor 119a for the specimen dispensing mechanism is driven. Thus, the specimen arm 118a rotates and moves to the specimen discharge position 123a, and after that, the specimen dispensing nozzle 116a performs the vertical moving operation. As such, the specimen dispensing nozzle 116a reaches a position and height at which the specimen can be discharged.

After the specimen dispensing nozzle 116a discharges the specimen, the motor 119a for the specimen dispensing mechanism is driven to allow the specimen arm 118a to rotate. After the specimen arm 118a moves to the specimen nozzle cleaning position 122a, the specimen dispensing nozzle 116a discharges the specimen remaining in the specimen dispensing nozzle 116a, and internal cleaning of the specimen dispensing nozzle 116a and external cleaning of the tip thereof are performed. After that, the specimen arm 118a moves to the specimen suction position 121a, and the suctioning operation described above is repeated. The suctioning and discharging cycles continue to be performed until the operation is interrupted.

Figure 3:
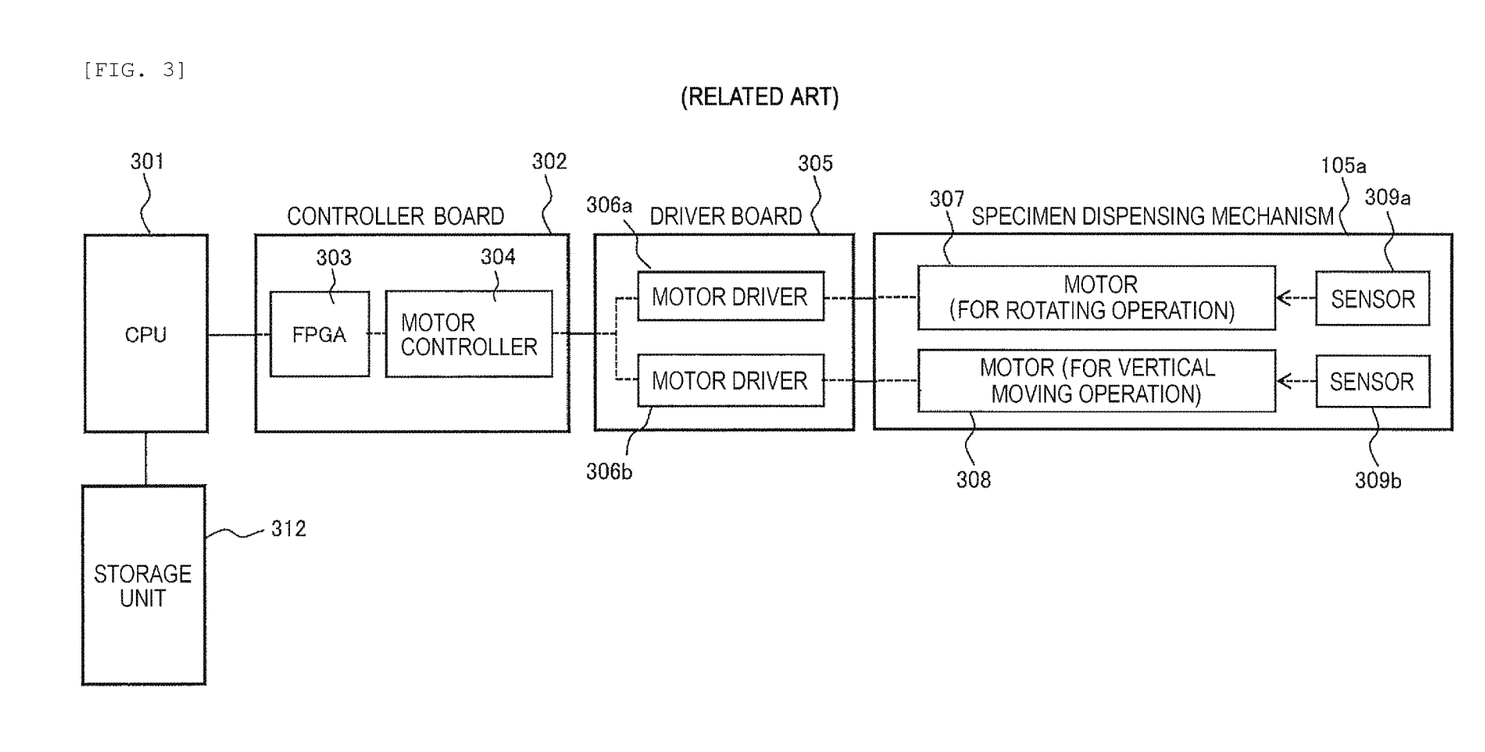
FIG. 3 is a diagram illustrating a control system related to a specimen dispensing mechanism in the related art.

FIG. 3 is a simplified diagram illustrating a control system related to a specimen dispensing mechanism in the related art.

When a central processing unit (CPU) 301 issues a command, a field programmable gate array (FPGA) 303 mounted on a controller board 302 (which may be called a motor controller board) receives the command, processes the command into a digital signal, and transmits the digital signal to a motor controller 304. The motor controller 304 outputs a pulse signal required for motor operation. The pulse signal is input to a first motor driver 306a and a second motor driver 306b mounted on a driver board 305. A storage unit 312 is connected to the CPU 301. The storage unit 312 is, for example, a semiconductor memory or a hard disk drive.

As the motor for driving the specimen dispensing mechanism 105a, the motor 119a for the specimen dispensing mechanism of FIG. 1 includes a motor 307 for the arm rotating operation and a motor 308 for the arm vertical moving operation of FIG. 3. The first motor driver 306a and the second motor driver 306b control the amounts, directions, timings, and the like of currents flowing through the motor 307 for the arm rotating operation and the motor 308 for the arm vertical moving operation to operate the motors. The position of the specimen dispensing mechanism 105a, which changes according to the operation of the motor, is constantly monitored by a first sensor 309a and a second sensor 309b until the power of the automatic analysis device is turned off. The operation of the specimen dispensing mechanism 105a in the automatic analysis device is stored in the storage unit 312 as an integrated program.

Figure 4:
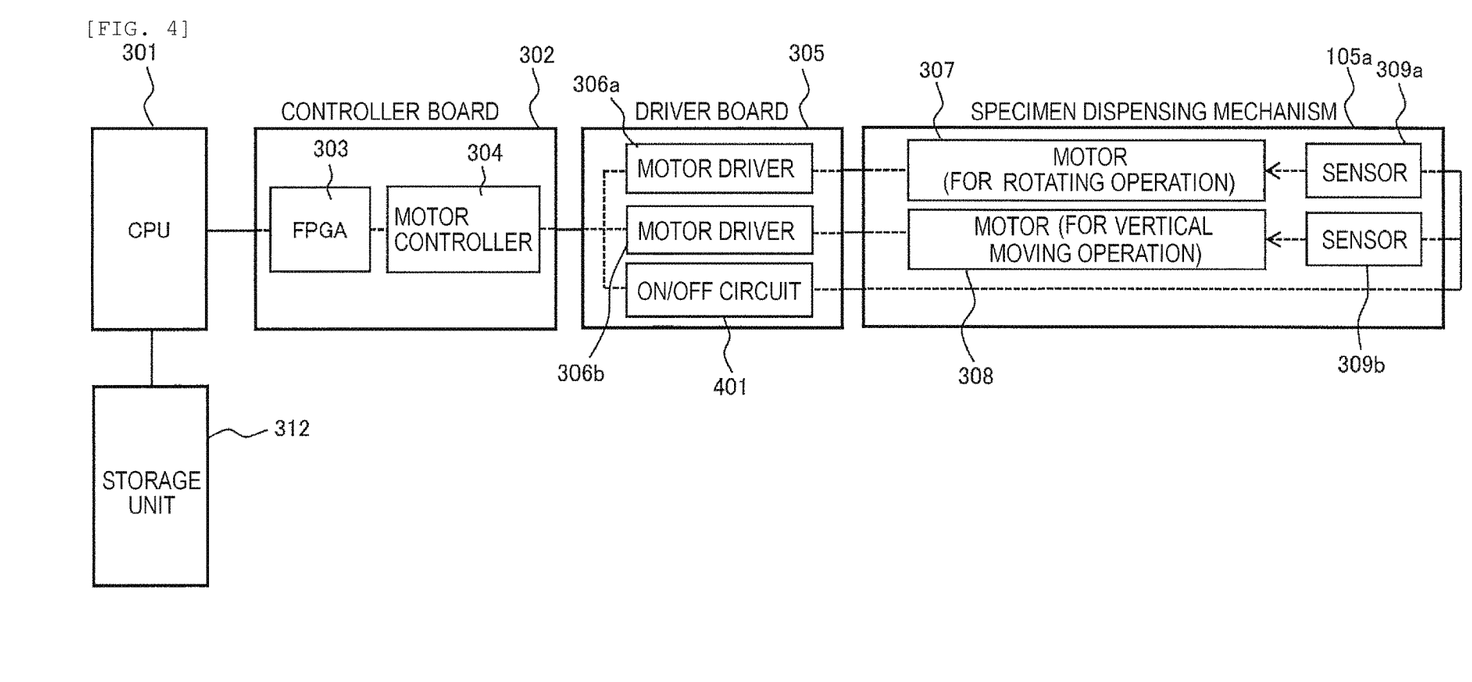
FIG. 4 is a diagram illustrating a specimen dispensing mechanism and a control system in a first embodiment.

FIG. 4 is a simplified diagram illustrating the specimen dispensing mechanism 105a and the control system 201 according to the embodiment of the present invention. The control system 201 includes the CPU 301, the controller board 302, the driver board 305, the first sensor 309a, and the second sensor 309b. The driver board 305 includes a motor driver circuit for driving the motor (the first motor driver 306a and the second motor driver 306b in this example) and a power control circuit (ON/OFF circuit 401 in the present example) for controlling the power supply to the sensor.

The automatic analysis device includes the motor 307 for the arm rotating operation and the motor 308 for the arm vertical moving operation that drive the specimen dispensing mechanism 105a. The first sensor 309a and the second sensor 309b monitor the operation of the motor 307 for the arm rotating operation and the operation of the motor 308 for the arm vertical moving operation, respectively. The CPU 301, the controller board 302, and the driver board 305 configure a control mechanism and control the operation of the motor 307 for the arm rotating operation and the operation of the motor 308 for the arm vertical moving operation.

In a control system in the related art illustrated in FIG. 3, even in a device state where power is supplied to the first sensor 309a and the second sensor 309b with the power of the automatic analysis device being turned ON and the specimen dispensing mechanism 105a does not operate, the power continues to be supplied until the power of the automatic analysis device is turned OFF. This is not limited to the specimen dispensing mechanism 105a, the power supply to sensors belonging to such a mechanism consumes a large amount of power, and in the system, the lifetime of the sensor is shortened.

In the first embodiment of the present invention illustrated in FIG. 4, when the CPU 301 issues the command, the FPGA 303 mounted on the controller board 302 receives the command, processes the command into a digital signal, and transmits the digital signal to the motor controller 304. The motor controller 304 outputs the pulse signal required for motor operation. The pulse signal is input to the first motor driver 306a and the second motor driver 306b mounted on the driver board 305. So far, the embodiment is substantially equivalent to the related art illustrated in FIG. 3.

In the embodiment, an ON/OFF circuit 401 that starts or stops the power supply to the first sensor 309a and the second sensor 309b is provided to the driver board 305. The operation control of the ON/OFF circuit 401 is performed by, for example, the motor controller 304. For example, a control function is built in the motor controller 304, and the power supply of the first sensor 309a and the second sensor 309b is controlled to be turned ON/OFF before and after the operation of the motor according to a motor drive pattern stored in advance. The motor drive pattern is stored in the storage unit 312, for example, before the analyzing unit 100 starts the operation.

Figure 5:
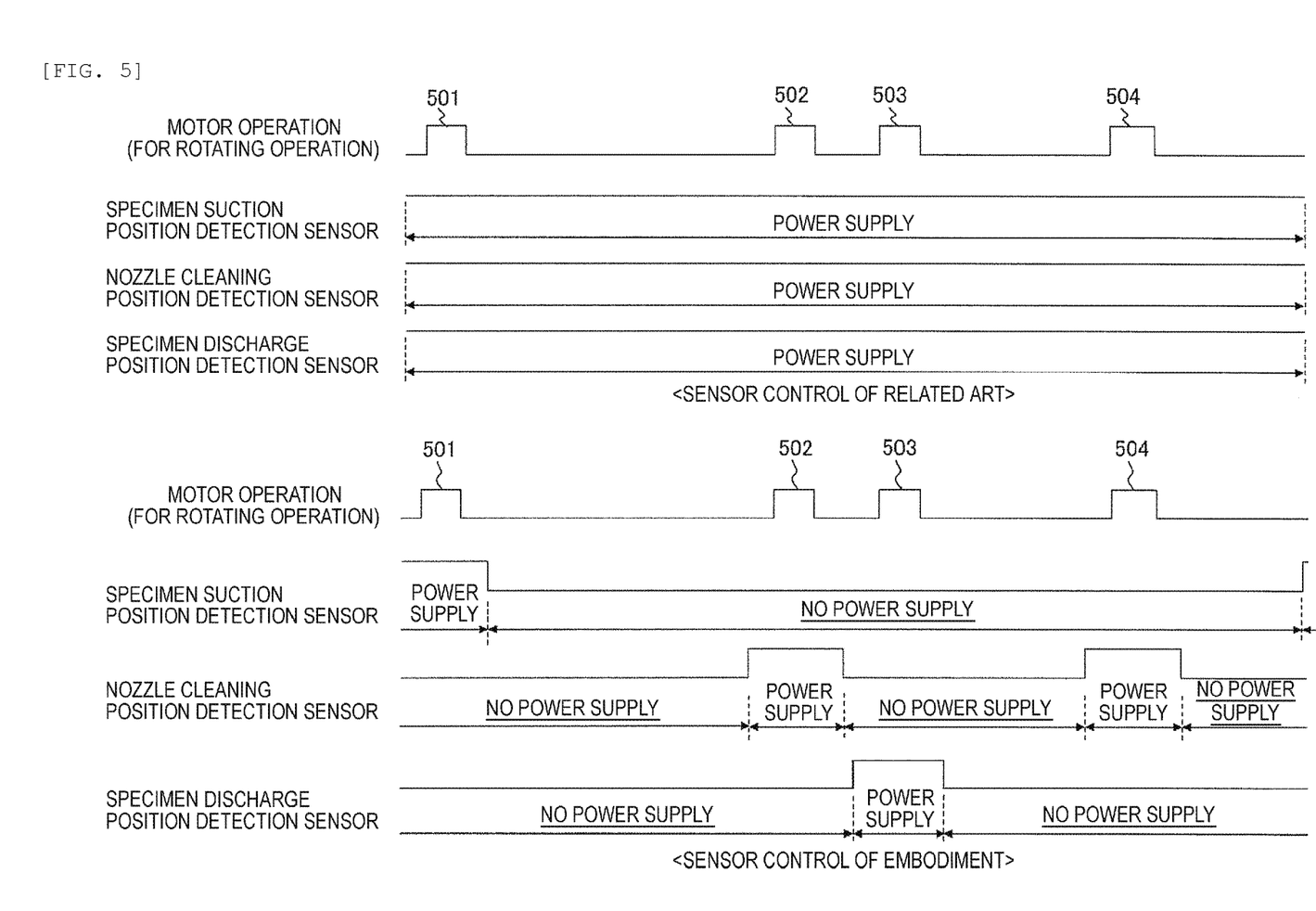
FIG. 5 is a diagram illustrating a power supply time to a sensor that detects a rotating operation of a specimen arm.
Figure 6:
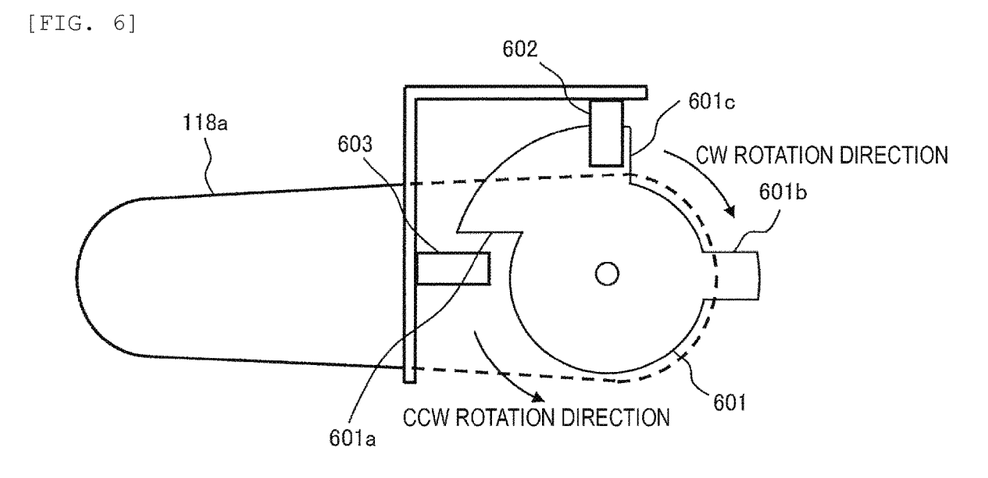
FIG. 6 is a schematic diagram of a vicinity of the sensor that detects the rotating operation of the specimen arm.

FIG. 5 is a diagram illustrating comparison of the power supply control to the first sensor 309a for detecting the rotating operation of the specimen arm 118a between the example of the related art and the first embodiment of the present invention. FIG. 6 is a schematic diagram of a vicinity of the first sensor 309a. A detection plate 601 is fixed to the specimen arm 118a to rotate integrally with the specimen arm 118a. The rotational direction is a counter clockwise (CCW) direction or a clockwise (CW) direction according to the control of the driver board 305. The first sensor 309a includes two photointerruptor (PI) sensor units, that is, a PI sensor unit 602 and a PI sensor unit 603. All of the sensor units function as sensors.

When the detection plate 601 is rotated in the CCW direction from the position illustrated in FIG. 6 by the motor 307 for the arm rotating operation, a first edge 601a of the detection plate 601 is detected by the PI sensor unit 603. In response to the detection, the operation of the specimen arm 118a is stopped. The operation corresponds to a motor operation 501 of FIG. 5 and represents an operation in which the specimen dispensing nozzle 116a moves from the specimen nozzle cleaning position 122a to the specimen suction position 121a.

That is, the "specimen suction position detection sensor" of FIG. 5 corresponds to the PI sensor unit 603 of FIG. 6. As illustrated in FIG. 5, power is supplied to the PI sensor unit 603 (or the first sensor 309a) only for the motor operation 501 and a predetermined time before and after the motor operation 501.

Next, when the detection plate 601 is further rotated in the CCW direction by the motor 307 for the arm rotating operation, a second edge 601b of the detection plate 601 is detected by the PI sensor unit 602. In response to the detection, the operation of the specimen arm 118a is stopped. The operation corresponds to a motor operation 502 of FIG. 5 and represents an operation in which the specimen dispensing nozzle 116a moves from the specimen suction position 121a to the specimen nozzle cleaning position 122a.

That is, the "nozzle cleaning position detection sensor" in the motor operation 502 of FIG. 5 corresponds to the PI sensor unit 602 of FIG. 6. As illustrated in FIG. 5, power is supplied to the PI sensor unit 602 (or the first sensor 309a) only for the motor operation 501 and a predetermined time before and after the motor operation 501.

Next, the detection plate 601 is rotated in the CW direction by the motor 307 for the arm rotating operation, and a third edge 601c of the detection plate 601 is detected by the PI sensor unit 603. In response to the detection, the operation of the specimen arm 118a is stopped. The operation corresponds to a motor operation 503 of FIG. 5 and represents an operation in which the specimen dispensing nozzle 116a moves from the specimen nozzle cleaning position 122a to the specimen discharge position 123a.

That is, the "specimen discharge position detection sensor" of FIG. 5 corresponds to the PI sensor unit 603 of FIG. 6. As illustrated in FIG. 5, power is supplied to the PI sensor unit 603 (or the first sensor 309a) only for the motor operation 503 and a predetermined time before and after the motor operation 503.

Next, the detection plate 601 is further rotated in the CW direction by the motor 307 for the arm rotating operation, and the third edge 601c of the detection plate 601 is detected by the PI sensor unit 602. In response to the detection, the operation of the specimen arm 118a is stopped. The operation corresponds to a motor operation 504 of FIG. 5 and represents an operation in which the specimen dispensing nozzle 116a moves from the specimen discharge position 123a to the specimen nozzle cleaning position 122a.

That is, the "nozzle cleaning position detection sensor" in the motor operation 504 of FIG. 5 corresponds to the PI sensor unit 602 of FIG. 6. As illustrated in FIG. 5, power is supplied to the PI sensor unit 602 (or the first sensor 309a) for the motor operation 504 and a predetermined time before and after the motor operation 504 in addition to the above-mentioned motor operation 502 and the predetermined time before and after the motor operation 502.

The four motor operations 501 to 504 illustrated in FIG. 5 are the operations of one cycle of the specimen dispensing mechanism 105a. As illustrated in FIG. 5, in the method of the related art, power is continuously supplied to each of the sensors, and monitoring is constantly performed. On the other hand, in the first embodiment of the present invention, as illustrated in FIG. 5, an operation pattern of the motor 307 for the arm rotating operation is stored in advance, and power is supplied to the sensor only for the time required for detection by the sensor.

That is, the control mechanism configured with the CPU 301, the controller board 302, and the driver board 305 has a function of starting and stopping power supply to the first sensor 309a, the PI sensor unit 602, or the PI sensor unit 603 at a predetermined timing stored in advance. The specific timings of starting and stopping the power supply are preferably defined by the program executed by the CPU 301, but the timings of starting and stopping the power supply may be defined in the FPGA 303 or may be defined by hardware or software of the motor controller 304.

More specifically, the control mechanism configured with the CPU 301, the controller board 302, and the driver board 305 may have a function of starting the power supply to the first sensor 309a, the PI sensor unit 602, or the PI sensor unit 603 before only a first predetermined time from the time when the motor 307 for the arm rotating operation starts the rotating operation and a function of stopping the power supply to the first sensor 309a, the PI sensor unit 602, or the PI sensor unit 603 after only a second predetermined time from the time when the motor 307 for the arm rotating operation terminates the rotating operation. Similarly to the above description, the specific timings of starting and stopping the power supply are preferably defined by the program executed by the CPU 301, but the specific timings of starting and stopping the power supply may be defined in the FPGA 303 or may be defined by the hardware or software of the motor controller 304.

The first predetermined time and the second predetermined time may be the same or different from each other. For example, all of the first predetermined time and the second predetermined time may be set to 100 ms, but the values may be values within a range of 10 ms to 200 ms, or may be values other than the range. In the case of controlling a plurality of sensors, the values may be the same for all of the sensors or may be different for some or all of the sensors. The time stored in advance by the control mechanism may be the times when the motor 307 for the arm rotating operation starts and terminates the rotating operation or may be times obtained by adding or subtracting the first predetermined time and the second predetermined time to or from the times.

The method of acquiring the "time when the motor 307 for the arm rotating operation terminates the rotating operation" can be arbitrarily designed, but for example, a detection time by the first sensor 309a may be used, a control signal output from the motor controller 304 may be used, or a predefined and stored time may be used.

For example, the control mechanism may have
a function of controlling the ON/OFF circuit 401 to start the power supply to the first sensor 309a, the PI sensor unit 602, or the PI sensor unit 603,
a function of controlling the first motor driver 306a to start the rotating operation of the motor 307 for the arm rotating operation after only a fifth predetermined time from a time when the ON/OFF circuit 401 starts the power supply to the first sensor 309a, the PI sensor unit 602, or the PI sensor unit 603, and
a function of stopping the power supply to the sensor after only a sixth predetermined time from the time when the ON/OFF circuit 401 starts the power supply to the first sensor 309a, the PI sensor unit 602, or the PI sensor unit 603.

The fifth predetermined time and the sixth predetermined time can be appropriately designed based on the above-mentioned first predetermined time, second predetermined time, and the like. For example, the fifth predetermined time may be a time equal to the first predetermined time. The sixth predetermined time may be a sum of the first predetermined time, the second predetermined time, and the operating time of the motor.

According to such method, it is possible to reduce the power consumption of the sensor. For example, it is assumed that one operation cycle of the specimen dispensing mechanism 105a is 3.6 s. In the technique of the related art, the power supply to the sensor is always performed, but when the method is applied, in some cases, the power supply to the sensor may be performed for 0.5 s on average per motor operation. Therefore, when a configuration is assumed in which four times of the position detection are performed by different sensors, it is possible to reduce the power consumption to 0.5/3.6=1/7.2≈14% as compared with the technique of the related art.

Ideally, it is desirable to start the power supply to the sensor immediately before the starting of the motor operation and to stop the power supply to the sensor immediately after the terminating of the motor operation. However, since it is actually necessary to consider the response speed of the sensor and the like, in the embodiment, the power supply is turned ON and OFF with a margin of 100 ms before and after the motor operation. Although the embodiment is an embodiment relating to the specimen dispensing mechanism 105a, any sensor for detecting the operation of the motor or the rotation position of the motor can be applied. For example, the configurations with the analyzing unit 100 can be applied to the sensors used in the conveying line 101, the rotor 102, the reagent disk 103, the reaction disk 104, the reaction cell cleaning mechanism 108, and the nozzle cleaning mechanism 109 and can be applied to most of the sensors used in the device. There is a possibility that the embodiment can not be applied to some sensors that require constant power supply (a temperature sensor for maintaining the reaction solution at a constant temperature by a heater, a sensor for detecting liquid exhaustion of a reagent, or the like).

The automatic analysis device is used in hospital and outsourced clinical testing businesses, and after the power supply to the device, the device is assumed to be used in any one of the standby mode (standby state) and the operation mode (analysis operation state). Specially in the standby mode, except for some sensors (the above-mentioned temperature sensor or the like) that always require power supply, in the technique of the related art in which power supply to the sensor is always performed, since the power supply is not performed by the method, it is considered that the effect of the present invention is great.

According to such method, it is possible to achieve the power saving of the automatic analysis device and the extension of the lifetime of the sensor.

In the first embodiment, since all of the first motor driver 306a, the second motor driver 306b, and the ON/OFF circuit 401 are provided on the same driver board 305, the number of boards can be relatively reduced.

Second Embodiment

In a second embodiment, the power control circuit is formed in a different board in the first embodiment. Hereinafter, the second embodiment of the present invention will be described with reference to FIGS. 5 and 7.

Figure 7:
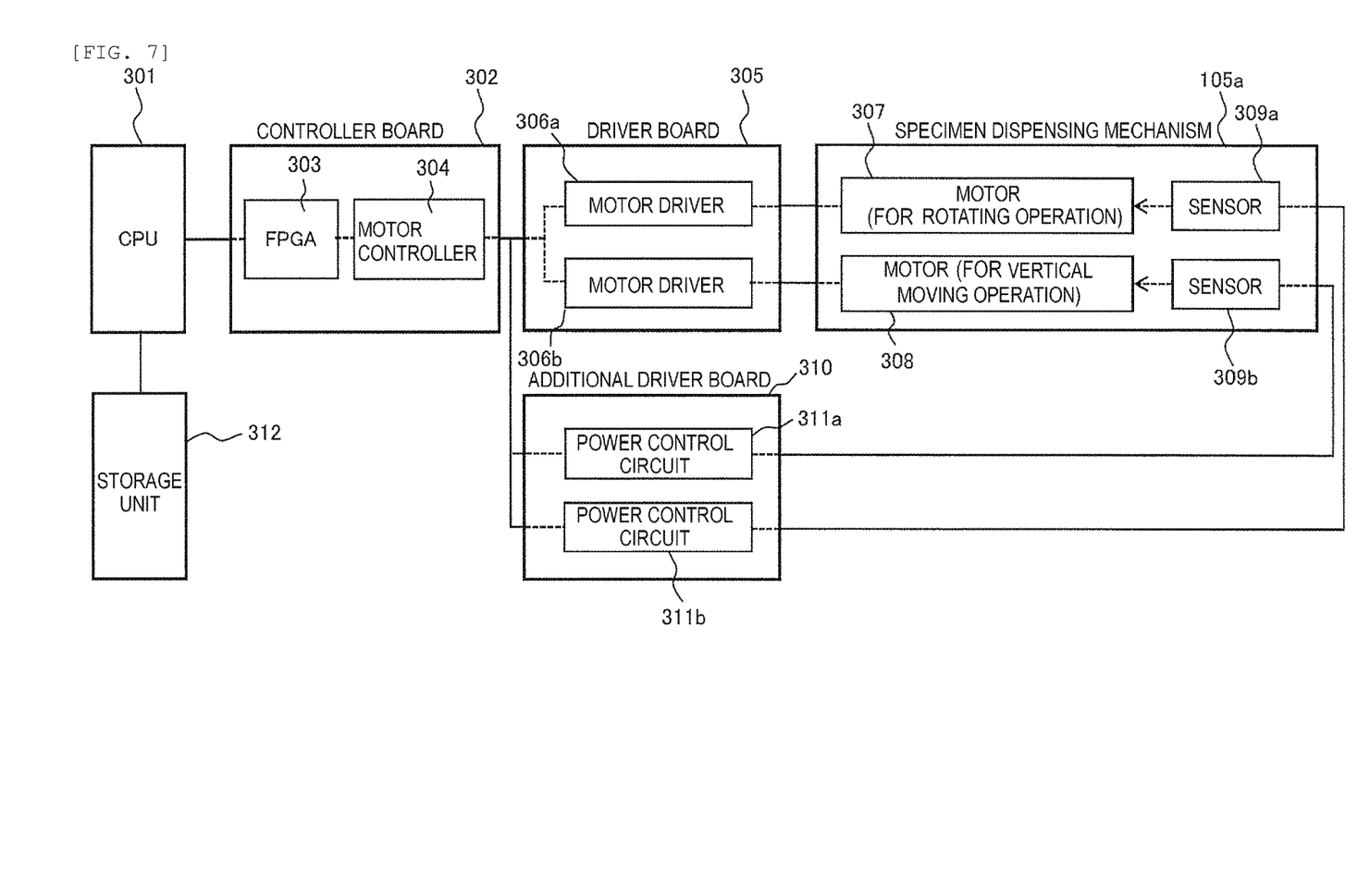
FIG. 7 is a diagram illustrating a specimen dispensing mechanism and a control system in a second embodiment.

FIG. 7 is a simplified diagram illustrating a specimen dispensing mechanism 105a and a control system 201 according to the second embodiment of the present invention.

In the second embodiment, the control system 201 includes an additional driver board 310 that is different from the driver board 305. In the process of operation of the control system 201 described in the first embodiment, the signal output from the motor controller 304 that drives each motor is transmitted to the additional driver board 310 in addition to the driver board 305.

The control system 201 includes a first power control circuit 311a and a second power control circuit 311b. In the second embodiment, the power control circuit is provided not as the ON/OFF circuit 401 but as the first power control circuit 311a and the second power control circuit 311b. Each of the first power control circuit 311a and the second power control circuit 311b includes a built-in ON/OFF circuit and is mounted on the additional driver board 310. The signal from the motor controller 304 is also input to the first power control circuit 311a and the second power control circuit 311b.

The motor controller 304 outputs a rotation control signal for controlling the rotating operation of the motor. Each of the first power control circuit 311a and the second power control circuit 311b includes a built-in ON/OFF circuit, receives the rotation control signal, and controls the power supply to the corresponding sensor (each of the second sensor 309b and the first sensor 309a) in response to the rotation control signal.

In the embodiment, since the power control circuit and the motor driver are provided on different boards, there is an advantage that the controller board 302 and the driver board 305 of the related art can be used without changing the boards.

According to the embodiment, as illustrated in FIG. 5, by supplying power for only the time required for monitoring by the sensor, the power saving of the automatic analysis device and the extension of the lifetime of the sensor can be achieved.

Third Embodiment

In a third embodiment, the function of the power control circuit in the first embodiment is realized by an integrated program (integrated software). Hereinafter, the third embodiment of the present invention will be described with reference to FIGS. 5 and 8.

Figure 8:
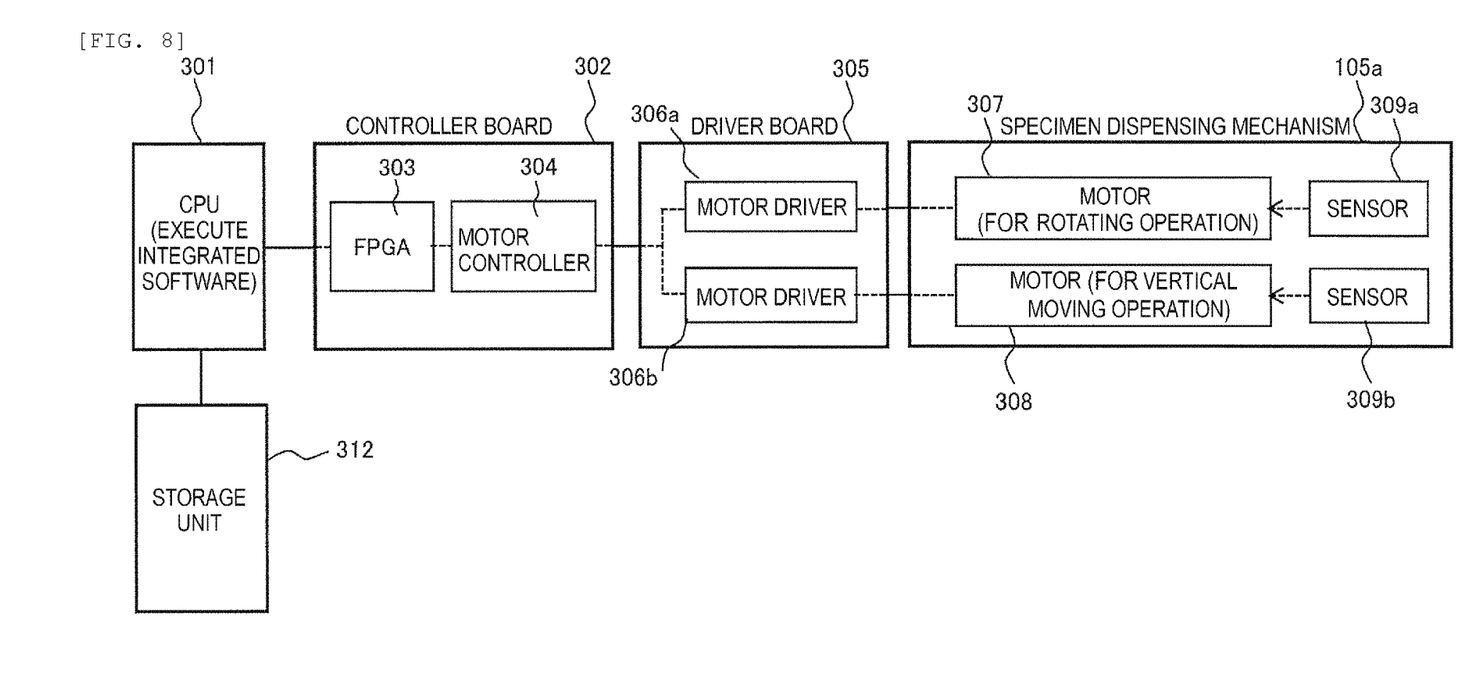
FIG. 8 is a diagram illustrating a specimen dispensing mechanism and a control system in a third embodiment.

FIG. 8 is a simplified diagram illustrating the specimen dispensing mechanism 105a and the control system 201 according to the embodiment of the present invention.

The CPU 301 executes the integrated program stored in the storage unit 312, and thus, the operation of the control system 201 as described in the first embodiment is realized. The operation of the motor may be defined in advance, for example, as a fixed parameter of the integrated program. The CPU 301 realizes a function of controlling the power supply to the first sensor 309a and the second sensor 309b by executing the integrated program. That is, the CPU 301 controls ON/OFF of the power supply to the first sensor 309a and the second sensor 309b through the motor controller 304, the first motor driver 306a, and the second motor driver 306b by executing the integrated program.

Although not particularly illustrated in FIG. 8, in the third embodiment, the power control circuit for controlling the power supply to the sensor may be provided.

As such, the control system 201 includes the CPU 301 for controlling the controller board 302 and the controller board 302, and the control system 201 realizes each function by allowing the CPU 301 to execute the integrated program.

According to the third embodiment, since the power control of the first sensor 309a for monitoring the motor 307 for the arm rotating operation illustrated in for example, FIG. 5 can be executed, the power saving of the automatic analysis device and the extension of the lifetime of the sensor can be achieved.

In the third embodiment, since the timing of the control operation related to the power supply to the sensor is defined not by the motor controller 304 but by the integrated program, the motor controller 304 of the related art can be used without changing.

Fourth Embodiment

In a fourth embodiment, the timings of starting and stopping the power supply to the sensor are changed in the first embodiment. Hereinafter, the fourth embodiment of the present invention will be described with reference to FIGS. 5 and 9.

In the example of FIG. 5, as sensors for monitoring the operation of the motor 307 for the arm rotating operation, illustrated are three sensors of a specimen suction position detection sensor, a nozzle cleaning position detection sensor, and a specimen discharge position detection sensor in one cycle of the entire operations. In the case of the embodiment, the three sensors are assumed to be configured as different hardware. Here, the power supply time is distributed among the three sensors.

There are sensors such as the nozzle cleaning position detection sensor which operate twice during one cycle operation. In the example of FIG. 5, there is an interval of about 900 ms from the motor operation 502 of the nozzle cleaning position detection sensor to the next motor operation 503. Thus, even when the power supply to the nozzle cleaning position detection sensor is turned ON and OFF with a margin of 100 ms before and after each motor operation, there is a large margin in the time until the next detection operation, and a response speed or the like does not matter.

Figure 9:
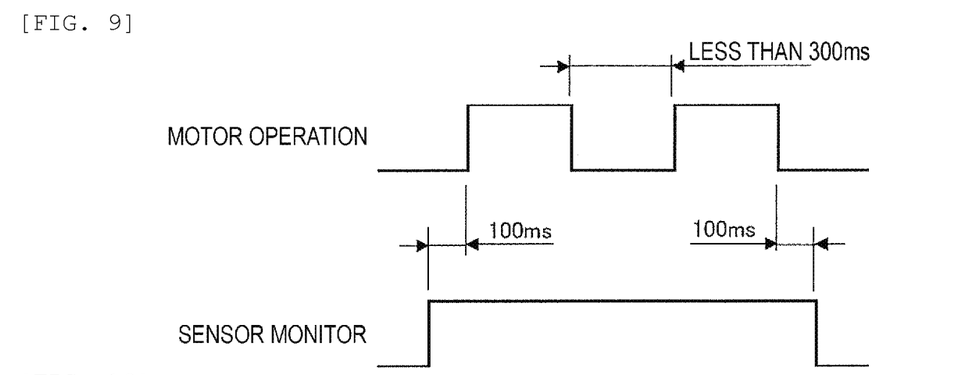
FIG. 9 is a simplified diagram illustrating start and stop timings of power supply according to a fourth embodiment.

However, there are cases where it is necessary to monitor the operation of the motor at smaller intervals due to the operation of the device. FIG. 9 is a simplified diagram illustrating timings of starting and stopping the power supply according to the fourth embodiment. The interval between the two motor operations is as small as less than 300 ms. When the interval is shortened as such, there is a possibility that malfunction may occur according to performance such as the response speed of the sensor.

Therefore, in the fourth embodiment, when the interval between the motor operations is less than a predetermined time, the power supply to the sensor continues to be performed. That is, when the time from the terminating of the first rotating operation to the starting of the second rotating operation following the first rotating operation of the motor is less than a predetermined time (third predetermined time), the control mechanism continues to perform the power supply to the sensor from the terminating of the first rotating operation to the starting of the second rotating operation.

The third predetermined time may be set to, for example, 300 ms. Here, a margin of 100 ms can be provided before and after the motor operation, and thus, it is considered to be suitable for performance such as the response speed of the sensor. As illustrated in FIG. 9, when the interval of the motor operation is less than 300 ms, the starting of the power supply to the sensor is performed at 100 ms before the start time of the first motor operation, and the stopping of the power supply to the sensor is performed after 100 ms from the time of the terminating of the second time of the motor operation.

The third predetermined time is not limited to 300 ms. For example, the value may be values within a range of 200 ms to 400 ms, or may be values other than the range.

The control mechanism includes
a function of controlling the power control circuit (for example, the ON/OFF circuit 401) to start power supply to the sensor,
a function of controlling the motor driver circuit (for example, the first motor driver 306a) to start the first rotating operation of the motor (for example, the motor 307 for the arm rotating operation) after only a seventh predetermined time after the controlling of the power control circuit to start the power supply to the sensor,
a function of controlling the motor driver circuit to stop the first rotating operation of the motor after the controlling of the motor driver circuit to start the first rotating operation of the motor,
a function of controlling the motor driver circuit to start the second rotating operation of the motor after the controlling of the motor driver circuit to stop the first rotating operation of the motor, and a function of stopping the power supply to the sensor after only an eighth predetermined time from the time when the power control circuit starts the power supply to the sensor.

However, the eighth predetermined time is a time stored in advance so that the power supply to the sensor continues to be performed from the starting of the first rotating operation of the motor to the stopping of the second rotating operation.

The seventh predetermined time and the eighth predetermined time can be appropriately designed based on the above-mentioned first predetermined time, second predetermined time, and the like. For example, the seventh predetermined time may be a time equal to the first predetermined time. The eighth predetermined time may be a sum of the first predetermined time, the time from the starting of the first rotating operation to the terminating of the second rotating operation, and the second predetermined time.

With such a power supply operation, it is possible to supply power so that the sensor operates reliably even when the interval of the motor operation is so small that the response speed of the sensor causes a problem. Since the power supply can be turned OFF when the power supply is not necessary, the power saving of the automatic analysis device and the extension of the lifetime of the sensor can be achieved.

Fifth Embodiment a fifth embodiment is modified in the first embodiment to output an alarm when the rotating operation of the motor is not detected. Hereinafter, the fifth embodiment of the present invention will be described with reference to FIG. 10.

Figure 10:
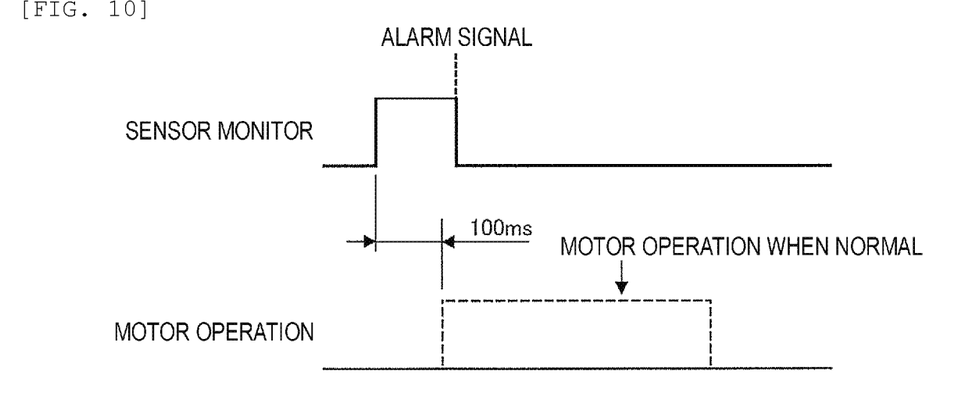
FIG. 10 is a simplified diagram illustrating power supply control to a sensor when a motor does not rotate in a fifth embodiment.

FIG. 10 is a simplified diagram illustrating the power supply control to the sensor when the motor does not rotate in the embodiment. Step-out or the like may be considered as the cause of non-rotation.

Similarly to the first to fourth embodiments, the power supply to the sensor is started 100 ms before the time when the motor starts the rotating operation. After that, a normal operation is that the motor starts the rotating operation. Herein, it is assumed that the motor does not rotate for some reason and does not operate even after a normal timing (that is, after 100 ms after the starting of the power supply to the sensor) elapses.

In the control system 201 according to the sixth embodiment, the control mechanism has a function of outputting an alarm signal when a fourth predetermined time elapses in a state where the sensor does not detect the rotating operation of the motor after the starting of the power supply to the sensor. The fourth predetermined time may be set to, for example, 100 ms. The fourth predetermined time may be a time obtained by adding an arbitrary margin time to 100 ms.

The control mechanism may determine that a state where the fourth predetermined time elapses in a state where the sensor does not detect the rotating operation of the motor is an abnormal state (or step-out state). Although persons skilled in the art can arbitrarily design the format, content, outputting method, and the like of the alarm signal, for example, when the automatic analysis device includes the motor control unit, the alarm signal may be transmitted to the CPU 301 through the motor control unit. The CPU 301 may receive the alarm signal by executing an integrated program. When the automatic analysis device includes a graphical user interface (GUI), the CPU 301 may display a warning on the GUI.

During the time when the motor is operating normally, since the control system 201 according to the fifth embodiment operates in the same manner as in the first to fourth embodiments, the power saving of the automatic analysis device and the extension of the lifetime of the sensor can be achieved. As illustrated in FIG. 10, the control system 201 interrupts the power supply to the sensor after outputting the alarm signal. Here, the motor controller 304 excites the brake mechanism that suppresses the future rotation of the motor to prevent the motor from rotating. By doing so, it is possible to achieve the power saving of the automatic analysis device and the extension of the lifetime of the sensor.

According to the fifth embodiment, when the motor does not rotate normally, an alarm signal is output, so that it is possible to accurately detect an abnormality of the motor.

Sixth Embodiment a sixth embodiment is modified in the fifth embodiment not to interrupt the power supply to the sensor. Hereinafter, the sixth embodiment of the present invention will be described with reference to FIG. 11.

Figure 11:
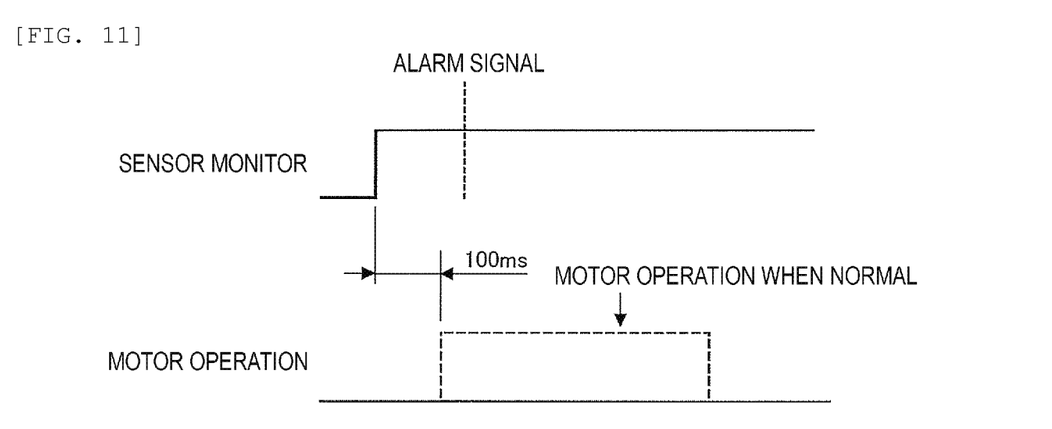
FIG. 11 is a simplified diagram illustrating power supply control to a sensor when a motor does not rotate in a sixth embodiment.

FIG. 11 is a simplified diagram illustrating power supply control to a sensor when a motor does not rotate in the embodiment. Unlike the fifth embodiment (FIG. 10), a control mechanism continues to perform the power supply to the sensor after the outputting of the alarm signal. That is, after the alarm signal is output, the power supply to the sensor continues to be performed even after a second predetermined time elapses from the time when the motor terminates the rotating operation. In other words, after the alarm signal is output, the "function of stopping the power supply to the sensor" is not executed. More specifically, after the alarm signal is output, the "function of stopping the power supply to the sensor after only a second predetermined time from the time when the motor terminates the rotating operation" is not executed. By doing so, when the motor starts the rotating operation with a delay, this state can be detected. The motor controller 304 does not control (excite the brake mechanism, or the like) for suppressing the future rotation of the motor.

During the time when the motor is operating normally, since the control system 201 according to the sixth embodiment operates in the same manner as in the first to fifth embodiments, it is possible to achieve the power saving of the automatic analysis device and the extension of the lifetime of the sensor.

According to the sixth embodiment, when the motor does not rotate normally, an alarm signal is output, so that it is possible to accurately detect an abnormality of the motor.

In the above-described first to sixth embodiments, the contents described by taking the first sensor 309a and the motor 307 for the arm rotating operation as an example can be similarly applied to the second sensor 309b and the motor 308 for the arm vertical moving operation and can be similarly applied to a combination of a another sensor and another motor.

In the above-described first to sixth embodiments, the contents described by taking the specimen arm 118a for dispensing the specimen as an example can be similarly applied to the reagent arm for dispensing the reagent.

All publications, patents and patent applications cited in the present specification are incorporated herein by reference in their entirety.

REFERENCE SIGNS LIST

100: analyzing unit
101: conveying line
102: rotor
103: reagent disk
104: reaction disk
106: stirring mechanism
107: spectrometer
108: reaction cell cleaning mechanism
109: nozzle cleaning mechanism
110: specimen container
111: rack
112: reaction cell
113: reagent container
114: shield portion
115: control unit
116: dispensing nozzle
120: light source lamp
124: data storage unit
201: control system
301: CPU
302: controller board
303: FPGA
304: motor controller
305: driver board
307: motor for arm rotating operation (motor)
308: motor for arm vertical moving operation (motor)
309a: first sensor (sensor)
309b: second sensor (sensor)
310: additional driver board
401: OFF circuit
501, 502, 503, 504: motor operation
601: detection plate
602,603: PI sensor unit (sensor)
101a: specimen conveying line
101b: reagent conveying line
105a: specimen dispensing mechanism
105b: reagent dispensing mechanism
109a: specimen nozzle cleaning mechanism
109b: reagent nozzle cleaning mechanism
116a: specimen dispensing nozzle
116b: reagent dispensing nozzle
117a: specimen liquid level sensor
118a: specimen arm
119a: motor for specimen dispensing mechanism
121a: specimen suction position
122a: specimen nozzle cleaning position
123a: specimen discharge position
123b: reagent discharge position
306a: first motor driver
306b: second motor driver
309a: first sensor
309b: second sensor
311a: first power control circuit
311b: second power control circuit
601a: first edge
601b: second edge
601c: third edge

The invention claimed is:

1. A control system comprising:
a sensor for monitoring an operation of a motor; and
a control mechanism for controlling the operation of the motor,
wherein the control mechanism includes:
a function of starting power supply to the sensor before only a first predetermined time from a time when the motor starts a rotating operation,
a function of stopping the power supply to the sensor after only a second predetermined time from a time when the motor terminates the rotating operation, a function of outputting an alarm signal when a fourth predetermined time elapses in a state where the sensor does not detect the rotating operation of the motor after the starting of the power supply to the sensor, and the control mechanism does not execute the function of stopping the power supply to the sensor after only a second predetermined time from the time when the motor terminates the rotating operation after the outputting of the alarm signal, and wherein when a time from the terminating of the first rotating operation of the motor to the starting of a second rotating operation following the first rotating operation is less than a third predetermined time, the control mechanism continues to perform the power supply to the sensor from the terminating of the first rotating operation to the starting of the second rotating operation.

2. The control system according to claim 1, further comprising:
a driver board, wherein
the driver board includes a motor driver circuit for driving the motor and a power control circuit for controlling the power supply to the sensor.

3. The control system according to claim 1, further comprising:
a controller board; and
a processor for controlling the controller board, wherein
the control system realizes each of the functions by allowing the processor to execute an integrated program.

4. An automatic analysis device comprising:
the control system according to claim 1; and
the motor.

5. A control system comprising:
a sensor for monitoring an operation of a motor; and
a control mechanism for controlling the operation of the motor,
wherein the control mechanism includes a function of starting and stopping power supply to the sensor at a predetermined timing stored in advance,
wherein the control system further comprises a driver board,
wherein the driver board includes a motor driver circuit for driving the motor and a power control circuit for controlling the power supply to the sensor, and wherein the control mechanism includes
a function of controlling the power control circuit to start the power supply to the sensor,
a function of controlling the motor driver circuit to start a rotating operation of the motor after only a fifth predetermined time from a time when the power control circuit starts power supply to the sensor,
a function of stopping the power supply to the sensor after only a sixth predetermined time from the time when the power control circuit starts the power supply to the sensor,
a function of controlling the motor driver circuit to start a first rotating operation of the motor after only a seventh predetermined time from the time when the power control circuit starts the power supply to the sensor,
a function of controlling the motor driver circuit to stop the first rotating operation of the motor after the motor driver circuit is controlled to start the first rotating operation of the motor,
a function of controlling the motor driver circuit to start a second rotating operation of the motor after the motor driver circuit is controlled to stop the first rotating operation of the motor,
a function of controlling the power control circuit to stop the power supply to the sensor after only an eighth predetermined time from the starting of the power supply to the sensor, and
the eighth predetermined time is a time stored in advance so that the power supply to the sensor continues to be performed from the starting of the first rotating operation to the stopping of the second rotating operation.

6. The control system according to claim 5, further comprising:
a controller board; and
a processor for controlling the controller board, wherein
the control system realizes each of the functions by allowing the processor to execute an integrated program.

7. An automatic analysis device comprising:
the control system according to claim 5; and
the motor.

* * * * *